(12) United States Patent
Kawamoto et al.

(10) Patent No.: US 7,868,265 B2
(45) Date of Patent: Jan. 11, 2011

(54) ELECTRODE WIRE FOR WIRE ELECTRIC DISCHARGE MACHINING

(75) Inventors: Yoshiaki Kawamoto, Settu (JP); Etsuro Moriyama, Toyama-ken (JP)

(73) Assignee: San-Etsu Metals Co., Ltd., Takaoka-Shi (JP)

( * ) Notice: Subject to any disclaimer, the term of this patent is extended or adjusted under 35 U.S.C. 154(b) by 327 days.

(21) Appl. No.: 11/056,332

(22) Filed: Feb. 11, 2005

(65) Prior Publication Data

US 2005/0189327 A1 Sep. 1, 2005

(30) Foreign Application Priority Data

Feb. 16, 2004 (JP) ............... 2004-037602

(51) Int. Cl.
*B23H 7/00* (2006.01)

(52) U.S. Cl. ............. 219/69.12; 219/69.11; 219/69.15; 219/69.17

(58) Field of Classification Search ............. 219/69.12, 219/69.11, 69.17, 69.15; 148/434
See application file for complete search history.

(56) References Cited

U.S. PATENT DOCUMENTS

| | | | |
|---|---|---|---|
| 4,036,669 A * | 7/1977 | Brook et al. ............... | 148/563 |
| 4,676,848 A * | 6/1987 | Ruchel et al. ............... | 148/434 |
| 5,196,665 A * | 3/1993 | Briffod ............... | 219/69.12 |
| 5,409,552 A * | 4/1995 | McDevitt et al. ............ | 148/434 |
| 5,808,262 A * | 9/1998 | Mukherjee ............... | 219/69.12 |
| 6,599,378 B1 * | 7/2003 | Hagiwara et al. ............. | 148/434 |
| 6,787,101 B1 * | 9/2004 | Dacker et al. ............... | 420/479 |
| 7,338,631 B2 * | 3/2008 | Ishida et al. ............... | 420/492 |

FOREIGN PATENT DOCUMENTS

| | | | |
|---|---|---|---|
| EP | 400561 A1 * | 12/1990 | |
| EP | 573780 A1 * | 12/1993 | |
| EP | 1080815 A1 * | 3/2001 | |
| JP | 3303296 B2 | 7/2002 | |

OTHER PUBLICATIONS

Cu-Zn phase diagram, Reed-Hill, Physical Metallurgy Principles, 1973, Van Nostrand, 2nd edition, p. 557.*
Cu-Zn phase diagram, Metals Handbook, 1973, ASM, 8th edition, v. 8, p. 301.*

* cited by examiner

*Primary Examiner*—M. Alexandra Elve
(74) *Attorney, Agent, or Firm*—Burr & Brown

(57) ABSTRACT

An electrode wire for wire electric discharge machining includes a binary alloy of copper and zinc. The electrode wire is manufactured by hot-extruding an alloy including copper and zinc at a predetermined ratio and then cold-drawing and annealing the hot-extruded alloy, and α phase crystals and β' phase crystals uniformly exist.

1 Claim, 4 Drawing Sheets

(DIAMETER DIRECTION, 10 μm)

ELECTRODE WIRE FOR WIRE ELECTRIC DISCHARGE MACHINING

CROSS REFERENCE APPLICATION

The present application claims priority from Japanese Patent Application No. 2004-37602, filed on Feb. 16, 2004, the entirety of which is hereby incorporated by reference.

BACKGROUND OF THE INVENTION

The present invention relates to an electrode wire for wire electric discharge machining.

More particularly, the present invention relates to an electrode wire for wire electric discharge machining which allows a workpiece to be melted and cut at high speed when causing an electric discharge to occur between the wire and the workpiece, exhibits higher productivity in comparison with a conventional high-speed electrode wire, and has excellent recyclability.

Wire electric discharge machining is a machining method which causes a workpiece to be melted and cut by causing an electric discharge phenomenon to occur between an electrode wire for wire electric discharge machining and the workpiece.

Since this machining method enables machining such as that using a fretsaw, this machining method is particularly suitable for machining a complicated shape.

As the electrode wire for wire electric discharge machining, an electrode wire is desired which enables high-speed machining and is inexpensive so that electric discharge machining cost can be reduced.

From the viewpoint of convenience, an electrode wire which enables an automatic connection so as to be able to deal with automated machining, or an electrode wire which rarely breaks is also desired.

An electrode wire made of a binary alloy of copper and zinc with a zinc content of 35 to 40% has been widely and generally used as such an electrode wire.

An electrode wire made of a binary alloy of copper and zinc with a zinc content of 35 to 40% is comparatively inexpensive, but is not necessarily sufficient from the viewpoint of the machining speed and the characteristics when causing a workpiece to be melted and cut.

Therefore, an electrode wire having a two-layer structure as shown in FIG. 4, in which a high-zinc-content brass layer is provided outside a core copper alloy in order to improve discharging properties, has been commercialized as an electrode wire in pursuit of high-speed machinability, for example.

An electrode wire having a three-layer structure as shown in FIG. 5, in which zinc is further provided in the outermost layer in order to further increase the speed, is also known.

The electric discharge machining speed is increased by increasing the zinc content in the coating layer. However, since the electrode wire having a multilayer structure has a complicated structure, manufacturing cost of the electrode wire is increased to a large extent.

Japanese Patent No. 3303296 discloses a technology aiming at increasing the zinc content while using a simple single-layer structure.

However, wire drawing cannot be substantially performed without adding an additional element such as Zr, Al, or Si, as described in the section "Means for Solving the Problems and Effect of the Invention" in this patent document which states "the electric discharge machining characteristics are improved by increasing the zinc content. However, processing into a thin wire is difficult by using a conventional processing method due to occurrence of the β phase".

However, the addition of such an additional element not only increases cost, but also poses a recyclability problem from the viewpoint of electrode wire wastes.

SUMMARY OF THE INVENTION

A first aspect of the present invention relates to an electrode wire for wire electric discharge machining, comprising a binary alloy of copper and zinc, wherein the electrode wire is manufactured by hot-extruding an alloy including copper and zinc at a predetermined ratio and then cold-drawing and annealing the hot-extruded alloy, and wherein $\alpha$ phase crystals and $\beta'$ phase crystals uniformly exist.

A second aspect of the present invention relates to an electrode wire for wire electric discharge machining, comprising a binary alloy of copper and zinc, wherein $\alpha$ phase crystals and $\beta'$ phase crystals uniformly exist.

A third aspect of the present invention relates to a method of manufacturing an electrode wire for wire electric discharge machining including a binary alloy of copper and zinc, the method comprising:

hot-extruding an alloy including copper and zinc at a predetermined ratio, and then cold-drawing and annealing the hot-extruded alloy.

DETAILED DESCRIPTION OF THE INVENTION

The present invention provides an electrode wire for wire electric discharge machining which has an improved electric discharge machining speed when causing a workpiece to be melted and cut between the electrode wire and the workpiece, excels in productivity in comparison with a conventional high-speed electrode wire, and has excellent waste recyclability.

One embodiment of the present invention provides an electrode wire for wire electric discharge machining, including a binary alloy of copper and zinc, wherein the electrode wire is manufactured by hot-extruding an alloy including copper and zinc at a predetermined ratio and then cold-drawing and annealing the hot-extruded alloy, and wherein $\alpha$ phase crystals and $\beta'$ phase crystals uniformly exist.

With this electrode wire for wire electric discharge machining, the electrode wire may be manufactured by repeatedly performing the cold-drawing and the annealing.

With this electrode wire for wire electric discharge machining, the binary alloy of copper and zinc may have an average zinc content per unit volume of 41 to 44%.

With this electrode wire for wire electric discharge machining the electrode wire may have a tensile strength of 700 to 1040 MPa.

With this electrode wire for wire electric discharge machining, the electrode wire may have a tensile strength of 700 to 900 MPa.

Another embodiment of the present invention provides an electrode wire for wire electric discharge machining, including a binary alloy of copper and zinc, wherein α phase crystals and β' phase crystals uniformly exist.

A further embodiment of the present invention provides a method of manufacturing an electrode wire for wire electric discharge machining including a binary alloy of copper and zinc, the method including:

hot-extruding an alloy including copper and zinc at a predetermined ratio, and then cold-drawing and annealing the hot-extruded alloy.

In general, the electric discharge machining speed when causing a workpiece to be melted and cut is increased as the zinc content in a binary alloy of copper and zinc is increased.

However, if the zinc content exceeds 40%, wire drawing capability is decreased to a large extent, whereby it becomes difficult to draw a wire as described above.

The reason therefor is considered to be as follows. When the zinc content is 40% or less, a binary alloy of copper and zinc contains only the α phase, which is a face-centered cubic lattice. When the zinc content exceeds 40%, the β' phase, which is a body-centered cubic lattice, starts to precipitate, and the wire breaks when the precipitation amount exceeds the wire drawing capable region.

The present inventors have arrived at the present invention by controlling the crystal structure of the final electrode wire by repeating cold drawing and annealing in stages while reducing the amount of precipitated β' phase, even if the zinc content is as high as 40% or more.

Figure 6:
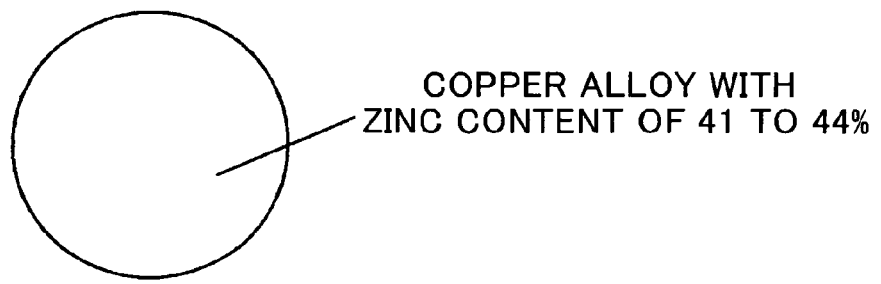
FIG. 6 shows an example of an electrode wire according to the present invention.

In more detail, the present invention provides an electrode wire for wire electric discharge machining, including a binary alloy of copper and zinc, the electrode wire being manufactured by hot-extruding an alloy including copper and zinc at a predetermined ratio into a circular rod, and cold-drawing and annealing the hot-extruded alloy in stages, with α phase crystals and β' phase crystals uniformly existing in the electrode wire at the final diameter. FIG. 6 shows an example of an electrode wire according to the present invention.

In the case of drawing the electrode wire to a final diameter of about φ 0.25 to 0.30 mm, the α phase crystals and the β' phase crystals are caused to uniformly exist by performing cold drawing and annealing in stages so that the tensile strength and the elongation at a wire diameter of about φ 0.9 mm are respectively 500 to 650 MPa and 15 to 30%, and annealing the product cold-drawn to the final wire diameter so that the tensile strength is in the range of 700 to 1040 MPa.

In particular, an electrode wire having a tensile strength of 700 to 900 MPa is excellent from the viewpoint of the electric discharge machining speed.

It is preferable that the binary alloy of copper and zinc have an average zinc content per unit volume of 41 to 44%.

The average zinc content is adjusted to 41 to 44%, because an increase in the electric discharge machining speed cannot be expected if the average zinc content is less than 41%, and it is difficult to control the crystal structure if the average zinc content exceeds 44%.

Figure 7:
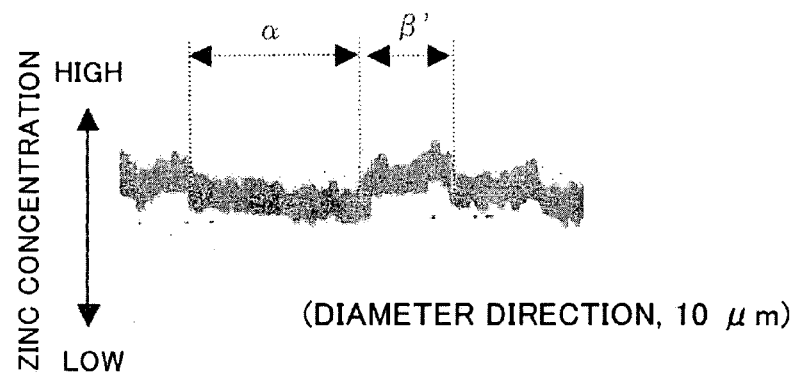
FIG. 7 shows an EPMA analysis chart example of an electrode wire according to the present invention.
Figure 8:
FIG. 8 shows an EPMA analysis chart example of a conventional electrode wire.

Since the α phase crystals and the β' phase crystals uniformly exist in the electrode wire of the present invention, the electrode wire partially includes a higher zinc content area and a lower zinc content area as shown in an EPMA analysis chart example in FIG. 7. Therefore, the average zinc content is used since the zinc content varies depending on the area.

The electrode wire for wire electric discharge machining according to the present invention increases the machining speed when causing a workpiece to be melted and cut by causing an electric discharge to occur between the wire (electrode wire) and the workpiece by controlling the crystal structure of the electrode wire as the final product. The evaluation results are described later.

The electrode wire according to the present invention excels in productivity in comparison with a conventional high-speed electrode wire and has excellent electrode wire waste recyclability, even if the binary alloy of copper and zinc with a high zinc content is used, by performing cold drawing and annealing in stages while preventing growth and dispersion of the crystals (β' phase). Therefore, the electrode wire according to the present invention has an extremely high industrial value.

A method of manufacturing the electrode wire for wire electric discharge machining of the present invention is described below in detail. The electrode wire for wire electric discharge machining of the present invention includes a binary alloy of copper and zinc having an average zinc content per unit volume of 41 to 44%, and the α phase crystals and the β' phase crystals uniformly exist in the final product (electrode wire).

EXAMPLE 1

Examples of the electrode wire for wire electric discharge machining of the present invention are described below in detail.

Copper and zinc ingots were dissolved, and an alloy was produced so that the average zinc content per unit volume was 42.5%.

The resulting copper-zinc alloy was hot-extruded while taking crystal growth into consideration, and repeatedly subjected to cold drawing and annealing in stages while reducing the amount of precipitated β' phase and nonuniform dispersion to obtain an alloy wire with a diameter of φ 0.9 mm.

The resulting alloy wire was cold-drawn to a diameter of φ 0.25 mm and 0.30 mm using a continuous slip drawing machine.

The resulting alloy wires were subjected to final electric annealing to obtain electrode wires of the present invention and reference electrode wires shown in Table 1.

The electrode wires of the present invention shown in Table 1 are examples in which the electrode wires are drawn to a final diameter of about φ 0.25 to 0.30 mm. The electrode wires of the present invention were cold-drawn and annealed in stages so that the tensile strength and the elongation at a wire diameter of φ 0.9 mm were respectively 500 to 650 MPa and 15 to 30%, and were annealed so that the tensile strength was 700 to 1040 MPa at the final wire diameter of the final product. As a result, the α phase crystals and the β' phase crystals uniformly exist in the electrode wires of the present invention shown in Table 1.

On the other hand, the reference electrode wires shown in Table 1 were annealed so that the tensile strength was less than 700 MPa or greater than 1040 MPa.

EXAMPLE 2

Copper and zinc ingots were dissolved, and alloys were produced so that the average zinc content per unit volume was 43.0% and 42.0%. Electrode wires of the present invention with a diameter of 0.25 mm were produced in the same manner as in Example 1.

The electrode wires of Example 1, Example 2, and Reference Example 1, and electrode wires containing only the α phase and having a zinc content of 37% as conventional electrodes were installed in a wire electric discharge machine ("RA90AT" manufactured by Mitsubishi Electric Corporation). The machining speed when machining a die steel (SKD-11) with a thickness of 50 mm under standard setting conditions was measured.

The tensile strength was also measured using a tensile tester.

Table 1 shows the target Zn content of the electrode wires of the present invention and the reference electrode wires, the speed ratio with respect to the conventional electrodes (100%), the tensile strength, and wire evaluation results based on four items consisting of the degree of speed effect, appearance and quality, cost performance, and recyclability.

In Table 1, the higher the speed ratio, the higher the speed. The wire evaluation is indicated in four stages in the order of "I", "II", "III", and "IV". The criteria are described under the table.

Recyclability Index
  I: I recyclability after use due to absence of metal other than copper and zinc
  II: limited recyclability due to inclusion of small amount of element other than copper and zinc
  III: considerable cost or time is necessary for recycling
  IV: unrecyclable The electrode wire was buried in a transparent resin. The electrode wire was carefully polished after the resin had been cured, etched using an aqueous ammonia solution, and subjected to crystal state observation using a metallurgical microscope.

Figure 1:
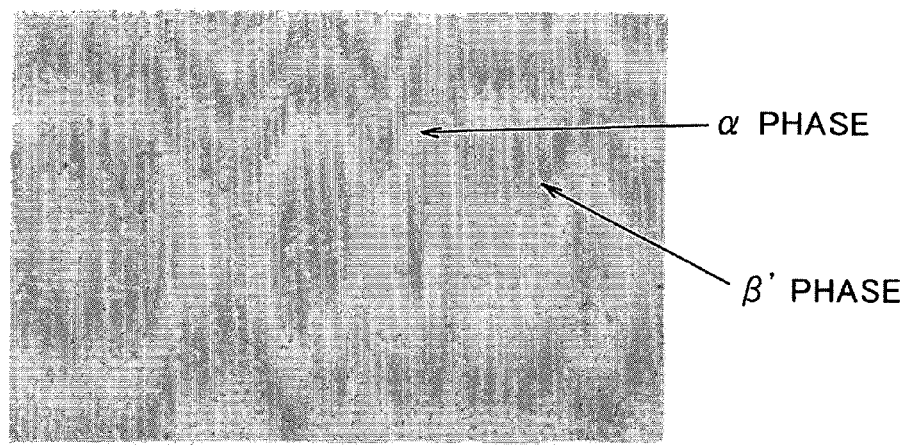
FIG. 1 shows an example of a type-A crystal structure.

The crystal structure of the electrode wire according to the present invention had a type-A crystal state as shown in FIG. 1, in which the white portion is the α phase and the black portion is the β' phase. The β' phase was minute, and the α phase and the β' phase existed uniformly.

Figure 2:
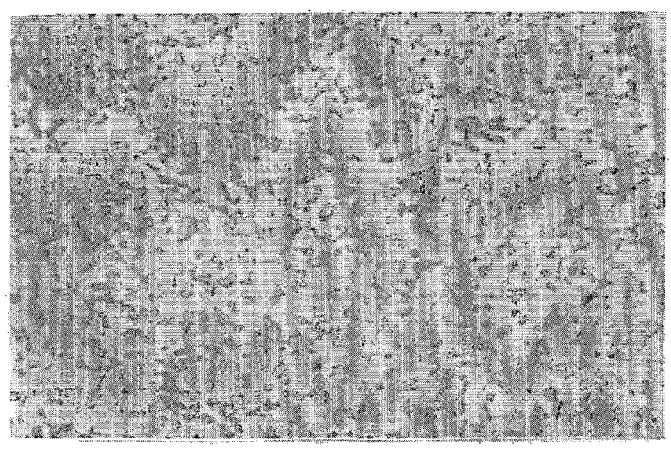
FIG. 2 shows an example of a type-B crystal structure.

The reference electrode wires shown in Table 1 were electrode wires having a tensile strength of less than 700 MPa or greater than 1040 MPa, and had a type-B crystal state as shown in FIG. 2.

The black portion is the β' phase. The crystals were larger than those of the type A shown in FIG. 1, and the β' phase was nonuniformly dispersed with respect to the α phase.

Figure 3:
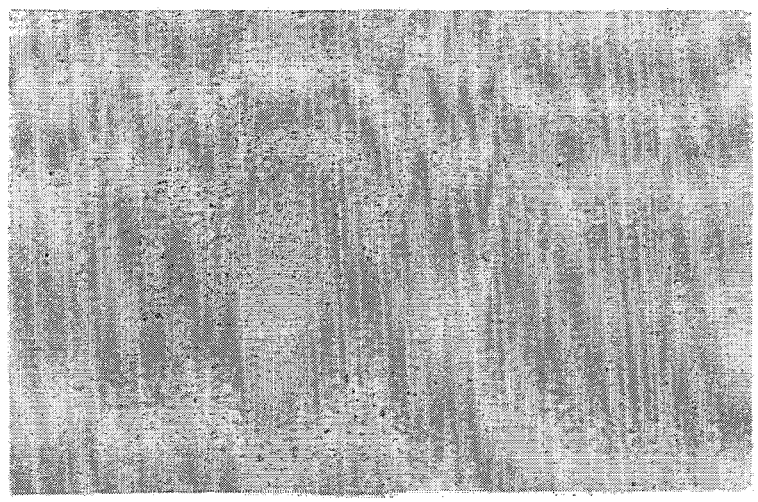
FIG. 3 shows an example of the crystal structure of a conventional electrode wire.
Figure 4:
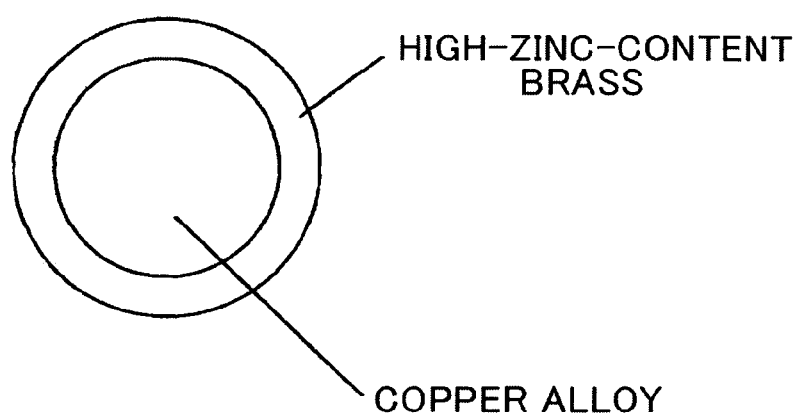
FIG. 4 shows an example of the structure of a conventional high-speed electrode wire having a two-layer structure.
Figure 5:
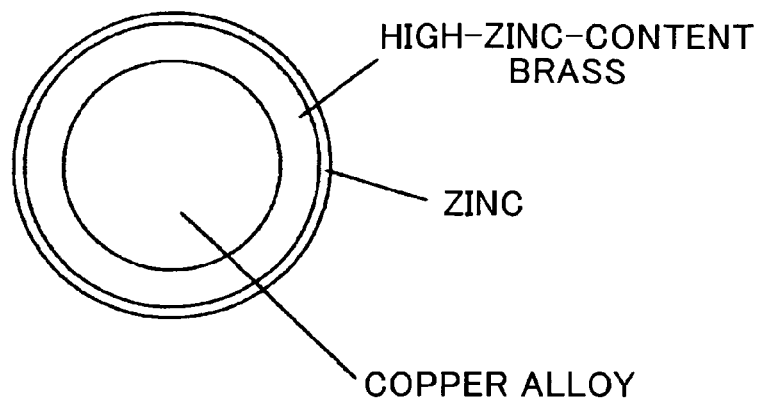
FIG. 5 shows an example of the structure of a conventional high-speed electrode wire having a three-layer structure.

FIG. 3 shows an example of the crystal structure of the conventional electrode wire with a zinc content of 37% as a reference. This crystal structure contains only the α phase.

TABLE 1

| | | Target Zn content (%) | d (outer diameter) (mm) | Tensile strength (MPa) | Speed ratio (%) | Speed effect | Appearance and quality | Cost performance | Recyclability |
|---|---|---|---|---|---|---|---|---|---|
| Electrode wire of present invention | 1 | 42.5 | 0.25 | 1023 | 107 | II | I | II | I |
| | 2 | 42.5 | 0.25 | 840 | 110 | I | I | II | I |
| | 3 | 42.5 | 0.25 | 764 | 110 | I | I | II | I |
| | 4 | 42.0 | 0.25 | 753 | 110 | I | I | II | I |
| | 5 | 43.0 | 0.25 | 771 | 110 | I | I | II | I |
| | 6 | 42.5 | 0.3 | 910 | 109 | II | I | II | I |
| | 7 | 42.5 | 0.3 | 750 | 113 | I | I | II | I |
| Reference electrode wire | 8 | 42.5 | 0.25 | 1053 | 104 | III | I | II | I |
| | 9 | 42.5 | 0.25 | 1053 | 106 | III | I | II | I |
| | 10 | 42.5 | 0.25 | 1049 | 106 | III | I | II | I |
| | 11 | 42.5 | 0.25 | 687 | 104 | III | I | II | I |
| | 12 | 42.5 | 0.3 | 650 | 104 | III | I | II | I |
| Conventional electrode wire | 13 | 37.0 | 0.25 | 1002 | 100 | — | I | I | I |
| | 14 | 37.0 | 0.30 | 996 | 100 | — | I | I | I |

Speed Effect Index
  I: speed ratio of 110 or more
  II: speed ratio of 107 to 109
  III: speed ratio of 101 to 107
  IV: no increase in speed Appearance and Quality Index
  I: no deficiency in appearance and quality
  II: acceptable for practical use although deficiency occurs to only small extent
  III: unacceptable in some applications due to occurrence of deficiency
  IV: unacceptable for practical use Cost Index
  I: very inexpensive
  II: comparatively inexpensive
  III: rather expensive
  IV: very expensive The average zinc content of the electrode wires according to the present invention was measured using an ICP method. As a result, it was confirmed that the difference between the measured average zinc content and the target value was within ±0.1%.

The above examples are described taking the case of using an electric annealing machine as an example. However, the present invention is not limited thereto. Annealing other than electric annealing may be employed.

The feature of the present invention is to control wire drawing and annealing so that the α phase crystals and the β' phase crystals uniformly exist at the product wire diameter.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method of manufacturing an electrode wire for wire electric discharge machining including a binary alloy of copper and zinc, the method comprising:

hot-extruding an alloy including copper and zinc having an average zinc content per unit volume of 41 to 44%;

repeatedly cold-drawing and annealing the hot-extruded alloy to form an electrode wire having a tensile strength of 500 to 650 MPa and an elongation of 15 to 30% at a wire diameter of about 0.9 mm;

cold drawing the electrode wire to a diameter of 0.25 mm to 0.30 mm using a continuous slip drawing machine; and annealing the resultant electrode wire;

wherein the resultant electrode wire has a tensile strength of 700 to 1040 MPa, and whereby $\alpha$ phase crystals and $\beta'$ phase crystals uniformly exist in a nonlayered manner in the resultant electrode wire.

* * * * *